(12) United States Patent
Wizdo et al.

(10) Patent No.: US 7,392,232 B1
(45) Date of Patent: Jun. 24, 2008

(54) METHOD FOR KNOWLEDGE MANAGEMENT

(75) Inventors: Lori D. Wizdo, Collegeville, PA (US); Ian Farbrother, West Chester, PA (US); Michael Williams McHugh, Bath (GB); Alex Martin Goodall, Oxford (GB); Robert Taylor, New Malden Surrey (GB); Barbara Toddie Geraghty, West Chester, PA (US); Susan Lee McCabe, Lafayette Hill, PA (US); James Kane, Collegeville, PA (US); N. Lee Beyer, New Hope, PA (US)

(73) Assignee: Unisys Corporation, Blue Bell, PA (US)

( * ) Notice: Subject to any disclaimer, the term of this patent is extended or adjusted under 35 U.S.C. 154(b) by 330 days.

(21) Appl. No.: 11/232,254

(22) Filed: Sep. 21, 2005

Related U.S. Application Data

(63) Continuation of application No. 09/907,211, filed on Jul. 17, 2001, now Pat. No. 7,003,502.

(51) Int. Cl.
   *G06F 17/00* (2006.01)
   *G06F 15/18* (2006.01)
   *G06N 5/00* (2006.01)
(52) U.S. Cl. ........................................................ 706/45
(58) Field of Classification Search ................. None
   See application file for complete search history.

(56) References Cited

U.S. PATENT DOCUMENTS

| 5,788,508 | A  |    | 8/1998  | Lee et al. ...................... 434/350 |
| 6,606,744 | B1 | *  | 8/2003  | Mikurak ....................... 717/174 |
| 6,609,128 | B1 | *  | 8/2003  | Underwood ................. 707/10 |
| 6,629,081 | B1 | *  | 9/2003  | Cornelius et al. ............. 705/30 |
| 6,633,878 | B1 | *  | 10/2003 | Underwood ................ 707/100 |
| 6,701,345 | B1 | *  | 3/2004  | Carley et al. ................. 709/205 |
| 6,701,514 | B1 | *  | 3/2004  | Haswell et al. ............. 717/115 |
| 6,721,713 | B1 | *  | 4/2004  | Guheen et al. .................. 705/1 |
| 6,904,408 | B1 | *  | 6/2005  | McCarthy et al. ............... 705/2 |
| 6,944,596 | B1 | *  | 9/2005  | Gray et al. ..................... 705/1 |

(Continued)

OTHER PUBLICATIONS

Jackson, J. et al., "A Tale of Two Cities: Starting Your Own Collaborative Practice Group", http://www.collabgroup.com/First_Three_Issues/groupformation.htm, Jun. 2, 2004, 6 pages.

(Continued)

*Primary Examiner*—Michael B Holmes
(74) *Attorney, Agent, or Firm*—Richard J. Gregson; Robert P. Marley; Woodcock Washburn

(57) ABSTRACT

A method of enabling a knowledge management community. A community is originated based on a vision of values and benefits that can be realized from the organized sharing of knowledge within a common group of people. The group is defined based on subject matter, interest, geography, or any other category. Based on the vision of a community, an initial definition of the community is created, including a community charter. Based on the community charter, the community is designed. The design of the community includes creating a matrix showing processes performed by members of the community and the outcomes of these processes, developing knowledge maps that show the knowledge used and created in performing processes, and defining metrics to measure the benefit derived from the sharing of knowledge within the community.

10 Claims, 5 Drawing Sheets

U.S. PATENT DOCUMENTS

| | | | |
|---|---|---|---|
| 6,948,070 B1 * | 9/2005 | Ginter et al. | 713/193 |
| 6,957,186 B1 * | 10/2005 | Guheen et al. | 705/1 |
| 7,051,212 B2 * | 5/2006 | Ginter et al. | 713/193 |
| 7,069,234 B1 * | 6/2006 | Cornelius et al. | 705/26 |
| 7,069,451 B1 * | 6/2006 | Ginter et al. | 705/51 |
| 7,076,652 B2 * | 7/2006 | Ginter et al. | 713/153 |
| 7,095,854 B1 * | 8/2006 | Ginter et al. | 380/233 |
| 7,100,195 B1 * | 8/2006 | Underwood | 726/2 |
| 7,100,199 B2 * | 8/2006 | Ginter et al. | 726/4 |
| 7,124,101 B1 * | 10/2006 | Mikurak | 705/35 |
| 7,130,807 B1 * | 10/2006 | Mikurak | 705/7 |
| 7,133,845 B1 * | 11/2006 | Ginter et al. | 705/51 |
| 7,149,698 B2 * | 12/2006 | Guheen et al. | 705/1 |
| 7,165,041 B1 * | 1/2007 | Guheen et al. | 705/26 |
| 7,167,844 B1 * | 1/2007 | Leong et al. | 705/80 |
| 7,206,805 B1 * | 4/2007 | McLaughlin, Jr. | 709/203 |
| 7,315,826 B1 * | 1/2008 | Guheen et al. | 705/7 |

OTHER PUBLICATIONS

Nickolas, F., "Communities of Practice Two Types of CoPs", http://home.att.net/discon/KM/CoPTypes.htm, Jun. 2, 2004, 2 pages.

Abilon, M., "The Evolution of Knowledge Management Within NCR Corporation", *ACM*, 1998, 4 pages.

Ferrán-Urdaneta, C. et al., "Teams or Communities? Organizational Structures for Knowledge Management", *ACM*, 1999, 128-134.

Vanhoenacker, J. et al., "Creating a Knowledge Management Architecture for Business Process Change", *ACM*, 1999, 231-241.

Wenger, E., "Communities of Practice Learning as a Social System", *Systems Thinker*, 1998, http://www.co-i-l.com/coil/knowledge-garden/cop/lss.shtml, 1998, 10 pages.

In the United States Patent and Trademark Office:, Notice of Allowance and Fee(s) due in related U.S. Appl. No. 09/907,211, filed Nov. 16, 2005, 3 pages.

* cited by examiner

METHOD FOR KNOWLEDGE MANAGEMENT

CROSS-REFERENCE TO RELATED CASES

This is a continuation of U.S. patent application Ser. No. 09/907,211, entitled "Method for Knowledge Management," filed on Jul. 17, 2001 now U.S. Pat. No. 7,003,502.

FIELD OF THE INVENTION

The present invention relates generally to the field of knowledge management. More particularly, the invention provides a technique creating knowledge communities and for marshalling, using, and sharing knowledge.

BACKGROUND OF THE INVENTION

Knowledge is one of the most important assets of any organization. In the information age, it can hardly be disputed that knowledge is value. It has been speculated that the ability of an enterprise to capture and share knowledge, and its ability to reuse, reinvent and innovate using that knowledge, will become a key determinant and predictor of the enterprise's value in the near future.

Knowledge management (KM) refers to a system for the codification, creation, storage, structuring, dissemination, application and sharing of an organization's knowledge assets. Knowledge management is, in some sense, a system for formally accounting for an organization's intellectual capital. Despite the clear importance of knowledge to any organization, such knowledge management systems have not gained widespread acceptance.

A principal reason why knowledge management is not widely used is that existing knowledge management techniques are not tightly bound with the business processes to which they relate, and thus are often perceived by those who must use them as unwieldy appendages. For example, an attempt to introduce knowledge management into an organization may fail because the knowledge management process is viewed by the people who must carry it out as a non-integrated separate project rather than a systemic change in the way work is performed. Within a business, there may be employee resistance to corporate initiatives. The management commitment for knowledge management may wane— particularly if the champion of knowledge management has left the organization, or if the benefits of knowledge management are not quickly and visibly realized. Similarly, since knowledge management must be carried out by the employees who participate in knowledge-using and knowledge-generating processes, employees may resist the knowledge management activities if the employees are not involved in the planning of the knowledge management system.

In view of the foregoing, there is a need for a technique for creating a sustainable knowledge management system that overcomes the drawbacks of the prior art.

SUMMARY OF THE INVENTION

The present invention provides a method of creating sustainable knowledge management practices by creating knowledge communities. A community is a group of people with a common purpose and a motivation to share knowledge. For example, a community may be focused by geography (e.g., all employees of a corporation located in the Philadelphia area), by subject matter (e.g., computers), a corporate division or department (e.g., the information technology department), by project (e.g., all employees working on the widget project), etc. In general, the communities are part of a larger organization, such as a large corporation.

A community is originated based on a vision that there is something to gain by people in a given community sharing knowledge. Typically, community-based knowledge management will be sponsored by the organization of which the communities are a part, and the organization may provide some central direction over the community origination process. Originating a community may, therefore, involve making a case to the organization that a community should be formed.

Once the case for the community has been accepted, the process of defining the community begins. The definition process includes creating a community charter that sets forth in some detail the vision for the community. The charter is preferably designed with a view toward the member drivers and outcomes, as well as toward the business drivers and outcomes that support the creation of the community (i.e., the reasons for which the community's potential members, and the organization of which they are a part, would want to form the community.

After the community charter is created, the community is designed. The process of designing a knowledge community begins with a consideration of those processes that relate in some way to the outcomes expected from creating the knowledge community. The view of processes may be captured in the form of a member/outcome matrix which shows, for each process, what class or classes of community member is or are associated with the process and to what outcome or outcomes classes of members contribute. The design process may also include the creation of a knowledge map, which preferably shows, for each process, sub-part of a process or activity, the knowledge used and created in the performance of the process, what is learned from carrying out the process, and knowledge transfer opportunities. The design process may also include the creation of a knowledge catalogue, which preferably documents the quality of the knowledge, its availability, current source, desired source, and whether the knowledge is explicit (i.e., stored in a form that is subject to content management processes, such as paper or electronic form) or tacit (i.e., not stored in a form susceptible to content management, but nevertheless known to at least one person).

Following design of the knowledge community, the community is developed, deployed, and sustained.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

The present invention provides a technique for enabling a knowledge management community that allows knowledge to be accounted for and shared. Knowledge management is a system for the codification, creation, storage, structuring, dissemination, application and sharing of an organization's knowledge assets.

Figure 1:
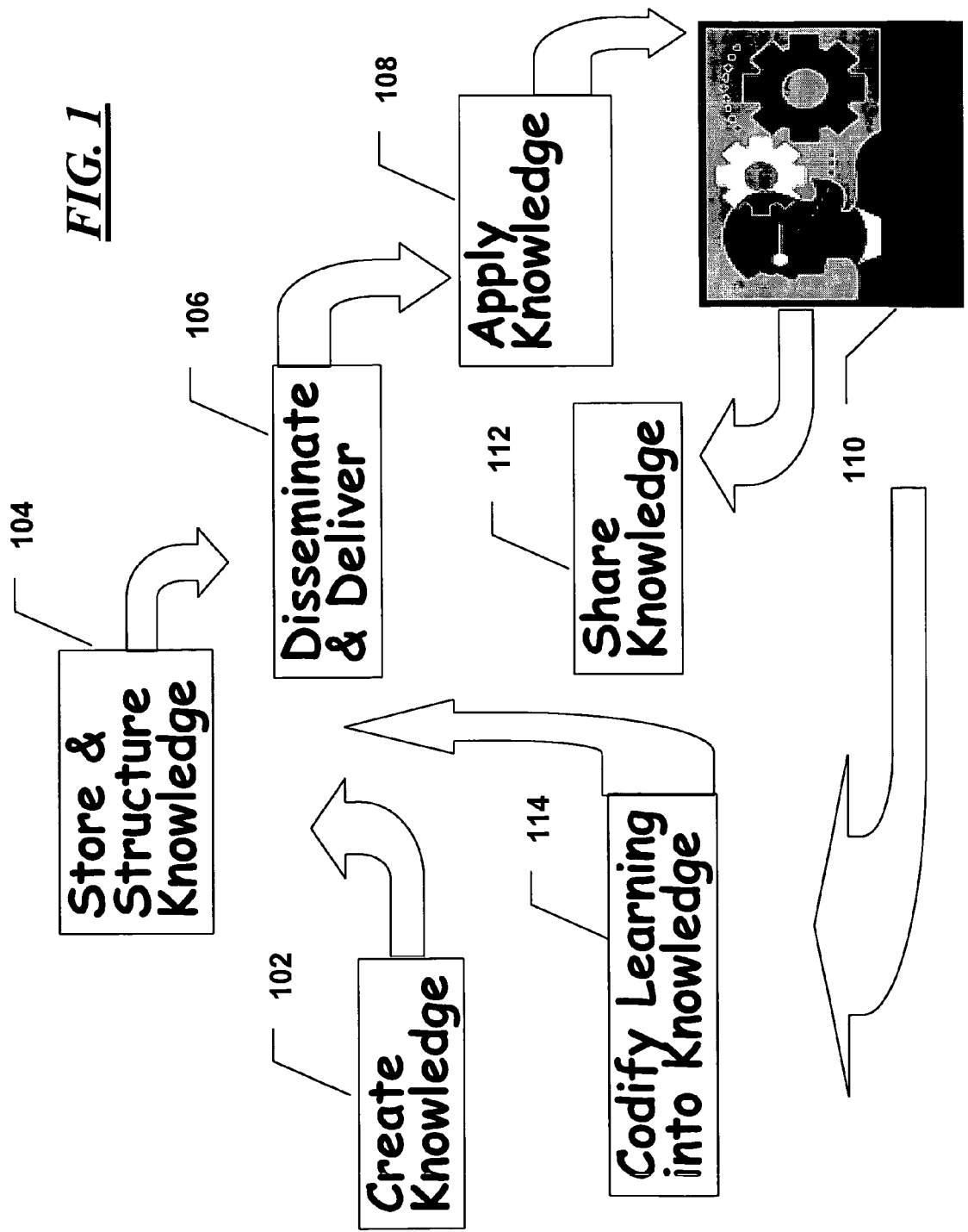
FIG. 1 is a flow diagram showing processes in a knowledge management system.

FIG. 1 shows a process of knowledge management. The flow shown in FIG. 1 is cyclic rather than terminal, since the process of creating and using knowledge is continuous. While the flow shown in FIG. 1 is not limited by any particular starting or ending point, an exemplary entry point for the process is the creation of knowledge (block 102). For example, knowledge may be created as a result of a World Wide Web search, research, brainstorming, etc. Following the creation of knowledge, the created knowledge is stored and structured (block 104). For example, knowledge may be indexed, stored in a database, stored in a hierarchical eXtensible Markup Language (XML) structure, etc.

When knowledge is stored and structured, it may be disseminated (block 106). Dissemination of knowledge may occur either electronically, or by more conventional physical means. For example, knowledge may be disseminated using intranets, portals, "e-Learning," seminars, face-to-face meetings, etc. Disseminated knowledge may then be applied (block 108). For example, an example of "knowledge" is a negotiating technique that has been particularly effective with a particular customer in the past. A corporate employee may receive this knowledge and apply it to a future negotiation.

When knowledge is applied, the person applying the knowledge may learn something in the process (block 110), and may thereby create new knowledge. This learning may be shared (block 112); it may also be codified into the form of new knowledge (block 114), which can then be stored and structured (block 104) in the same manner as the knowledge that was created at block 102. As can be seen, the process of acquiring, cataloguing, and sharing knowledge is cyclic and never-ending.

The present invention provides a technique that enables the process involved in FIG. 1 to take place by forming knowledge "communities." Before addressing the community-based technique of the invention, several terms used are explained.

Explanation of Knowledge Management Terms

"Information" is traditionally defined as data in the context of a concept. For example, the position of game pieces on a board (data) in the context of a particular game (e.g., chess) provides "information" about the current state of a chess game in progress.

"Knowledge" is information in the context of a particular use or process. Continuing with the chess example, in the context of playing chess, information about allowable moves of the chess pieces is knowledge. Orthogonally, in the context of the process of selling chess games, information about the relative popularity of oriental and military style chess pieces is knowledge.

Knowledge may be either "tacit" or "explicit." Explicit knowledge is knowledge that is captured in a tangible form, such as on paper or in the form of electronic data. "Tacit" or "implicit" knowledge is knowledge that is known to people, but that is not reduced to a tangible form. Examples of explicit knowledge include computer program code, written specifications, patents, policies and procedures, organizational charts, and plans. Examples of tacit knowledge include intuition, know-how, experience, judgment, and creativity.

An "organization" is an entity that has people who may have a need for knowledge sharing or knowledge management. Examples of an organization include a corporation, a university, and a governmental unit. Inasmuch as the present invention addresses the formation of knowledge communities, these "communities" are generally subsets of people within an organization (although a community may, in some cases, include people who are not formally part of the organization).

A "value outcome" (or "outcome") is a (valuable) result of taking some action. More particularly in the context of the creation of a knowledge community a "value outcome" (or "outcome") is the (valuable) result that it is directly attributable to the creation of a knowledge community. In general, the motivation for implementing knowledge management in an organization is to derive some value from doing so, or to produce some outcome. As further explained below, the result of a process is described in terms of the "value outcome" or "outcome" that it produces.

A "driver" is a compelling motivation to do something. In a business context, and usually referred to as a business driver, these are the key motives for management action and are usually the business issues, obstacles and/or opportunities facing a business. As explained below, one activity that generally precedes the formation of a knowledge community is an analysis of the "drivers" for forming the community. "Drivers" include both "member drivers" (i.e., the motivations of the prospective members of a community), and "business drivers" (i.e., the motivations of the larger organization of which those prospective members are a part).

Overall Process of Knowledge Community Enablement

The following is a description of an overall process for enabling a knowledge community within an organization. The process is described in terms of "activities," each of which may encompass one or more tasks that may take place sequentially or in parallel. An activity, in this regard, is a sub-part of the community enablement process, and generally represents a collection of actions that are conceptually grouped together for the purpose of the overall process. The various blocks in FIGS. 2-5 represent "activities."

Figure 2:
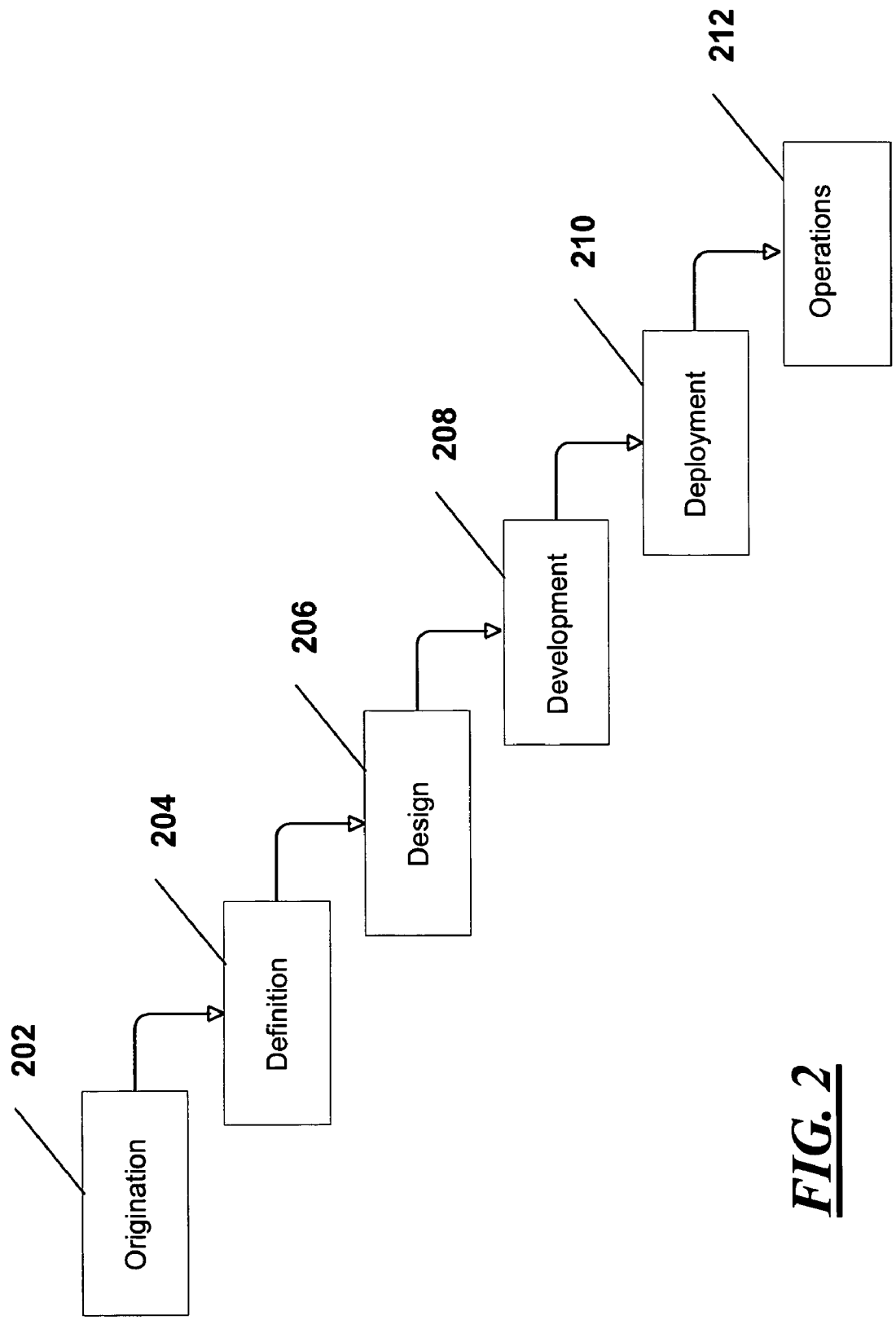
FIG. 2 is a flow diagram of a process of enabling a knowledge community.
Figure 3:
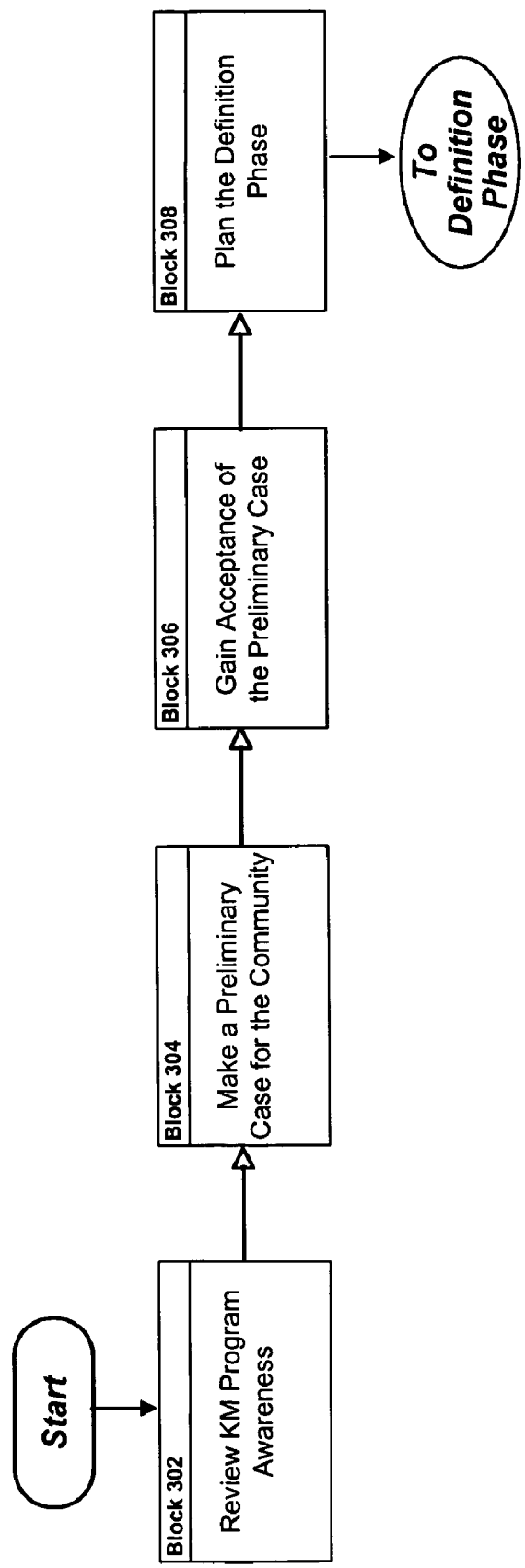
FIG. 3 is a flow diagram of an exemplary origination process.

FIG. 2 is a flow diagram showing an exemplary process of enabling a knowledge community in accordance with aspects of the invention. The initial phase of enabling a community is "origination" (block 202). Origination of the community is, essentially, an information gathering phase in which a case is made to the relevant organization (e.g., a corporation, a university, etc.) for the existence of the community. The goal of the origination phase is to provide a justification for initiating the creation of the community and, preferably, a priority of implementation within the other knowledge community opportunities. In this phase the case for the community is produced and, preferably, implementation teams representative of community members are identified. Ideally, the proponent of the origination of a community is someone in a position of relative authority within an organization, who believes that such a community is necessary to successfully achieve, or over achieve, business objectives and goals. Such a proponent typically has determined that it is advantageous to the organization to empower the members of the community to leverage the expertise and tacit knowledge residing within the community members. Typically, as part of the origination phase, the business and member needs, and the expected results of creating the community, are identified. The details of an exemplary origination phase is shown in FIG. 3

Figure 4:
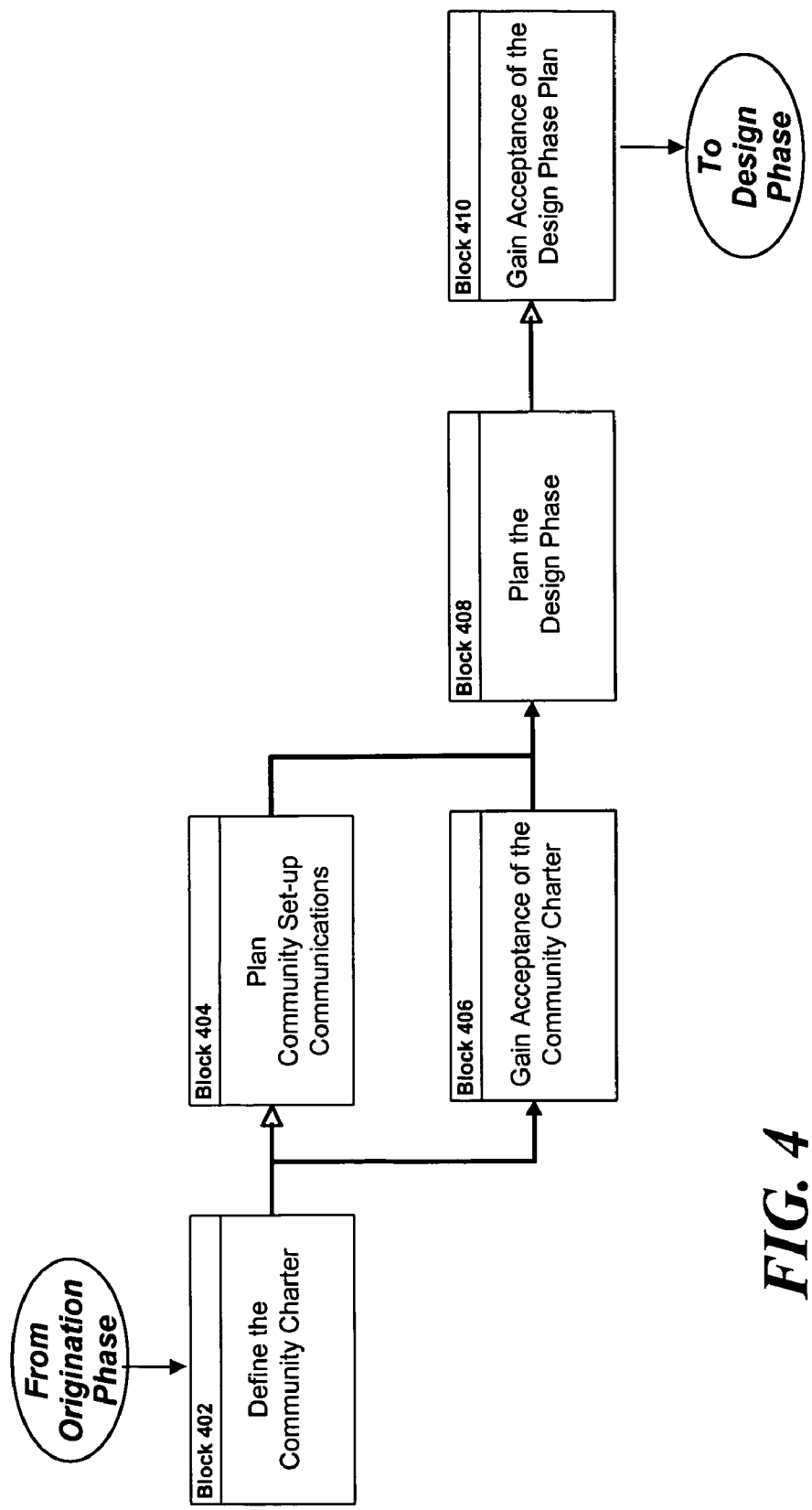
FIG. 4 is a flow diagram of an exemplary definition process.

The next phase of enabling a community is "definition" (block 204). In the definition phase, the community's mission and vision are defined to a much greater level of detail. Preferably, the definition of the community results in a community charter, which, among other things, lays out the community member profiles (i.e., a description of the people who will participate in the community), as well as defines the desired community "outcomes" (or "value outcomes") in support of achieving both business and member goals. Preferably, these "value outcomes" are identified based on the business and member motivations (i.e., "drivers") for forming the community. Value outcomes are more particularly discussed below; briefly, a value outcome is an identifiable (and preferably observable) result that can, in the case of knowledge communities, be derived from the better management of knowledge. Detail of an exemplary definition phase is shown in FIG. 4.

Figure 5:
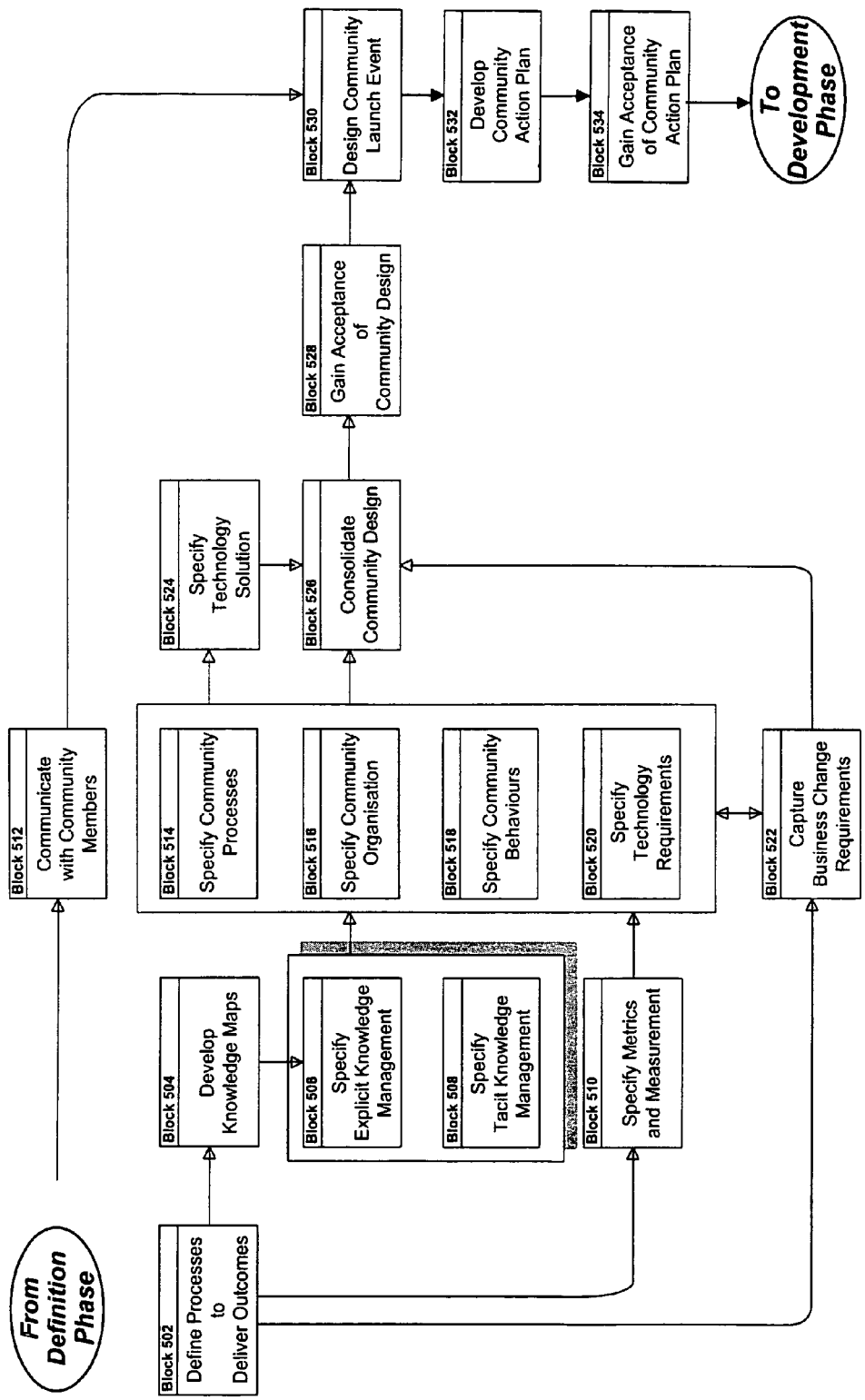
FIG. 5 is a flow diagram of an exemplary design process.

The next phase of enabling a community is the design phase (block 206). Design of a knowledge community includes creating a knowledge map that defines the knowledge items that community members need or generate in performing their jobs (or in engaging in other activities). The knowledge mapping process therefore includes identifying the processes and associated activities that are related causally to the expected community outcomes. Knowledge maps are more particularly described below. In addition to the creation of knowledge maps, the design phase includes the following activities:

- Defining, in detail, explicit knowledge requirements
- Defining tacit knowledge strategies and tactics
- Identify approaches to behaviors—for example how to best achieve knowledge sharing and participation—how to foster innovation
- Identifying business change requirements as needed
- Specifying the metrics & measurements for ensuring the community is achieving the desired outcomes
- Defining the community administration and other processes
- Defining the community organization with roles and responsibilities
- Defining an information technology (IT) solution, which may include a community enterprise knowledge "portal" or other functionality These activities (or any sub-combination thereof) may be performed in parallel during the definition phase, and preferably performed in the sequence identified in FIG. 5. Detail of an exemplary design phase is shown in FIG. 5.

Following the definition phase, the process of enabling a knowledge community proceeds to the development phase (block 208). At the development phase, all components of the community design are developed and assembled according to conventional development techniques. For example, if the knowledge management community is to be supported by computers, a team of programmers may be enlisted to create any necessary code, web pages, etc., that are needed to implement the knowledge management community.

After the development phase, the deployment phase begins (block 210). The deployment phase is when the system of knowledge management is brought into the community originated at step 202. The deployment phase may include communication and education programs designed to make members of the community aware of the knowledge sources in the community, as well as of their duties to participate in the collection and creation of knowledge.

Following the deployment phase is the operations phase (block 212). The operations phase is the phase at which the knowledge community fulfills its function of enabling the codification, creation, storage, structuring, dissemination, application and sharing of knowledge. Since a knowledge community is constantly evolving and changing, the operations phase may include components of other phases—such as changing the community definitions to meet the changing needs of the community, and performing any re-design or re-development necessitated by the changes.

Detail of Block 202: Exemplary Origination Phase

FIG. 3 is a flow diagram of an exemplary origination phase. The origination phase begins with a review of knowledge management awareness (block 302). This preferably includes reading white papers, viewing presentations and "e-Learning modules", or any other means to gain an understanding of the opportunities, motivations and plans for introducing knowledge management into the organization.

At block 304, a preliminary case is made for forming a new community. In essence, block 304 is where the business and community member needs, and the expected results of creating the community, are identified. In other words, the overall motivation for forming the community (and investing the necessary resources in the community) is identified both from the perspective of those people who will be members of the community (i.e., the member drivers), and from the perspective of the business of which those people are a part (i.e., the business drivers).

For example, block 304 may occur in the form of a prospective community's proponent(s) answering a set of questions, which may, optionally, be presented on a template. For example, a form may ask the following questions:

- Name of the proposed community
- Description of the proposed community
    - Who are the people in the community?
    - What are they going to do?
    - How does this community relate to others?
- Details of sponsor (Name, Title, Address, Phone, etc.)
- Proposed membership of the community
    - Where (which organizational groupings) will members come from?
    - What are the reasons that people would want to participate in the community?
    - Who are the people the community needs to participate?
    - How many people are expected to join the community?
- Proposed charter community council members
- Proposed community leader
- Proposed community set-up team
- The case for the community
    - What are the business issues, obstacles and/or opportunities that are driving the need for the proposed community?
    - What are the member issues, obstacles and/or opportunities that are driving the need for the proposed community?
    - What business outcomes or benefits will result from the proposed community?
    - What member outcomes or benefits will result from the proposed community?
    - What special costs are associated with creating the proposed community?
    - What risks are associated with creating the proposed community?

In this example, the answers to the above questions is the preliminary "case" for creating a new community.

At block 306, the preliminary case may be accepted. For example, in a given organization (e.g., corporation, university, etc.), there may be a person, board, or other entity that determines what communities the organization will invest in. The case prepared at block 304 argues, to this decision-making entity, in favor of creating a particular proposed community; if the case is persuasive, then a decision may be made at block 306 to invest in creating the community.

Once the preliminary case for the community has gained acceptance and a decision has been made to create the community, preliminary planning of the definition phase (e.g., the phase described at block 204 in FIG. 2) beings. For example, some of the information collected at block 304 (e.g., the identity of the members, predicted business and member outcomes/benefits, etc.) may be used to plan the definition phase.

Detail of Block 204: Exemplary Definition Phase

FIG. 4 is a flow diagram of an exemplary definition phase. The exemplary definition phase of FIG. 4 begins at block 402, wherein a charter for the community is defined.

The charter is intended to provide the definition of and "terms of reference" for the community, and to reflect the interests of the business and the members in the success of the community. The Charter is the key output of the definition phase (block 204) of the process shown in FIG. 2. The charter forms an authoritative definition of the community for all future set up and operational needs. The charter is used as both (a) a reference definition of the community and (b) the principal input into the design phase (block 206) of the process shown in FIG. 2.

In a preferred embodiment, the charter has the following main sections, which are described in detail below:
  Community Details
  Business and Organizational Context
  Vision
  Strategy
  Success Factors The charter takes the accepted case for the community (i.e., the case created at block 304 and accepted at block 306, of FIG. 3) as its key input and develops the ideas in that case further. Preferably, in a given organization (e.g., corporation, university, etc.) of which the community is a part, there may be a person, board, or other entity that approves knowledge communities and agrees to the charter. It should be noted that centralized institutional approval of the existence of the community (including it's charter) facilitates the sustainability of a knowledge management community in the event that the community's initial proponents have left the organization.

The following is a detailed description of sections for an exemplary charter:
  Community Details Section
  The input for the community details comes from the original case for the community (i.e., the case created at block 304 and accepted at block 306, of FIG. 3)—although the details in the original case are preferably fully reviewed at this stage, and may be altered. The details preferably include the following, or any subset or sub-combination thereof:
    Name of community: The name is preferably short and simple, but indicative of the essence of the community.
    Brief description, textually indicating:
    (1) who the community's members are in appropriate terms (e.g. their role, skill, organization etc)
    (2) what the subject/topic is that they are interested in
    (3) what the community members are going to do together as a community (e.g., what they will produce or contribute)
    Name/role/contact details of sponsor.
    Name/role/contact details of community council members who preferably do the following:
      actively and actually represent the constituencies of the organization (i.e., the corporation, university, etc., of which the knowledge community is a part)
      preferably understand knowledge management and the communities programme
      be respected members of the community
      have the requisite availability to fulfill their roles
      fit the role on merit
      together have a critical mass of influence in the community
    Name/role/contact details of community leader
    Date/version of charter. Show agreement by necessary parties (e.g., the signature of the organization's community council)
  Business and Organizational Context Section
    This section of the charter defines the scope of the community in terms of the business of the organization of which the community is a part, and in terms of external entities to which the community will relate. This section, therefore, indicates from where the community should draw its business drivers. Thus, this section of the charter lists:
      the internal and external businesses and/or organizations that will be impacted by the community
      the internal and external businesses and/or organizations that will impact on the community
    The businesses and organizations to be indicated are:
      those that are a constraint on the community, or that the community constrains
      those to which the community members belong or are a part of
      those that affect the community's drivers
      those that have an interest in the community's outcomes (i.e., the services and benefits it provides)
  Vision Section
    The vision comprises the following sub-parts. Preferably, all of these sub-parts are included in the vision section of the charter although any sub-set or sub-combination of the following items may be used provided that Community Outcomes are identified.
    Business Drivers—The drivers that are relevant to the business and organizational contexts that have been specified. These are the issues that are driving the business to want to change and/or implement the community. They are captured in order to record the business issues that support the need for the community.
    Business Outcomes—The desired outcomes relevant to the Business Drivers—what the business would like to see in future in respect of the business drivers. These are recorded in order to be able to judge the extent to which a community might provide the solution to the business' needs.
    Member Drivers—The issues that are driving prospective community members to want to change and/or be a member of the community. The motivations of prospective community members. These are captured in order to record the members' issues that support the need for the community.
    Member Outcomes—The outcomes that the prospective community members would like to see for themselves— i.e., what the members hope to get out of the community. These are recorded in order to be able to judge the extent to which a community might provide the solution to members' needs.
    Community Drivers—A re-phrasing as drivers of those business outcomes and member outcomes that are tractable to being addressed by a community. These are captured in order to record the relevant issues that support the need for the community.

Community Outcomes—The outcomes that the proposed community should provide and that satisfy community drivers. These are captured in order to record what it is intended that the community should provide and contribute for the business and its members.

Community Mission Statement—A sentence or slogan that captures the overall purpose and role of the community, holistically and preferably in the form of a memorable phrase.

Community Vision Statement—A translation of the community outcomes into a formal "value proposition" or "elevator statement." A purpose of this statement is to more fully and formally express the central purpose of the community.

Community Vivid Description—A relatively fuller exposition of the community outcomes in prose, describing the desired future state and how the community is envisaged to support the business and its members. The purpose of this is to provide a richer description of the "to be" state that can provide a good general background to the task of designing the community in detail and that can be used to express the community's long-term goals.

Business Change Register—A list of the changes required in order to realize the envisaged knowledge management system embodied in the community. These may include changes in all areas: e.g., changes in the people, process, information, knowledge and technology (IT), and structure.

The Vision Development Process

A step-by-step process for developing a vision is exemplified by the following activities:

Specify and record the business drivers for the relevant business and organizational context. Business Drivers are defined above. At this point all the real business needs, issues and opportunities should be surfaced, irrespective of their relevance to 'community'. Typically, the sponsor (i.e., the community's proponent) and the council members will know what these drivers are from their own job roles and responsibilities.

Specify and record the desired business outcomes relevant to the business drivers. Business outcomes are explained above. Specify these as statements of a desired future state or result. E.g. double-digit revenue growth. There need not be a one-to-one relationship between outcomes and drivers. However, sometimes an outcome may be a simple re-phrasing of a driver.

Specify and record the member drivers for the prospective community members. Member drivers are explained above. It is expected that the sponsor and council, as representatives of the members, should be able to specify what these drivers are. Make sure that all types of members (as defined in the case) are considered. Consider the motivations of the members and their personal, team, task, role and professional aspirations. E.g.:

Personal aspirations: e.g.: security, income, opportunity, personal achievement, employability Team aspirations: e.g.: team communications, fellowship, growth of team, achievement as a team Task aspirations: e.g.: work meaningfulness, things that make tasks easier to do Role aspirations: e.g.,: promotion Professional aspirations: e.g. to learn, to receive recognition, to contribute to their field Specify and record the desired Member Outcomes relevant to the Member Outcomes. Member Outcomes are defined above. Specify these as statements of a desired future state or result. E.g. increased network of peers across the company The next five steps are aimed at evaluating the applicability of a "community" as a solution to the identified drivers and outcomes. The particular outcomes that an organization is looking to achieve in respect of its knowledge management communities program are considered, and how these aspects support or bound the achievement of the particular community's desired outcomes. The sponsor and council will be aware of these from the information and training that has previously been made available to them (which can be referred to during this process). The following is a list of exemplary steps for performing this evaluation:

Convert the business outcomes and member outcomes into community drivers. This means reviewing the two lists of drivers and considering which ones of them give rise to a need, issue or opportunity that is a driver for having a community. Not all business and member outcomes are necessarily best served by establishing a community. It is at this point in the vision activity that one may start to apply a "community filter," which means selecting only those issues that are relevant to the community solution, as opposed to other solutions. Consider the alignment of the two sets of outcomes with (a) that which an organization is looking to achieve through its knowledge management communities program, and (b) the sorts of things that "community," as a solution model, is relevant to. The result should be the focused list of the drivers for having the proposed community—drivers that balance business and member needs and that are specifically relevant to "community" as opposed to alternative solution approaches.

Specify and record the community outcomes relevant to the community drivers. This list defines what it is that it is planned that the community will achieve or provide for the company and for its members.

Develop a community mission statement that encapsulates the process of achieving the community outcomes.

Develop a community vision statement based on the community outcomes. This is also of use as a communications vehicle. The vision statement has four parts:
Who obtains the value
What their problem/need/driver is
What the solution is
What the outcome is (e.g., what the solution provides that is valuable and unique)

Develop a community vivid description (discussed above). The process here is to consider the community outcomes and to envisage and state what the company would/will be like in order to satisfy the outcomes. Develop a Business Change Register (discussed above) in respect of the changes required that are either explicitly or implicitly identified in the vivid description.

Strategy Section

This section defines the community's strategic focus and how it intends to serve its strategy. This section includes:

Identification of the main, basic role(s) of the community and/or the relative priorities between the different roles that are relevant. The following is a list of exemplary community roles:

Helping: Such a community is primarily concerned with facilitating member networks and providing facilities that help its members do their jobs.

Knowledge stewarding: Such a community is primarily concerned with building a reusable knowledge base and knowledge assets for the members and the company in general to apply.

Best-practice sharing: Such a community is primarily concerned with facilitating the sharing of best practices across the company.

Innovating: Such a community is primarily concerned with facilitating the creation, development and rapid diffusion across the company of new ideas and initiatives.

A description of the main, basic means that the community will employ in order to serve its strategic focus/foci. For example:

The services the community will provide that will attract members

The events the community will run in order to generate the content it is tasked to so do The knowledge base that the community will develop How the community will support the knowledge needs of non-members and contribute to the Unisys knowledge base Success Factors Section This section preferably defines one or more of the following:

External requirements—non-community factors that are required in order for the community to be successful. These may be dependencies that the community has on other initiatives and changes. They may, for example, be identifiable by reference to those business outcomes that were not translated effectively into community drivers.

'Must do wells'—Things that the community must do well in order to succeed.

Special costs—Any particular cost items required by the community.

Inter-community relationships—Identification of other communities with which the community will have a relationship and a commentary on how this will be handled.

Special risks—Identification of any particular risks involved in the community achieving its aims.

Returning to FIG. 4, following the definition of the community charter at block 402, the definition phase proceeds to the activities of planning community set-up communications (block 404) and gaining acceptance of the community charter (block 406). Blocks 404 and 406 may be performed concurrently. Following the planning of community set-up communications and gaining acceptance of the charter, the definition phase proceeds to create a plan for the design phase (block 408), and to gain acceptance of the plan (block 410). As can be appreciated, the design phase may require a considerable investment of time and resources, and thus it may be desirable to create a plan for the design phase and to gain acceptance of the plan in order to support a sustainable commitment for the design phase on the part of the organization.

Detail of Block 206: Exemplary Design Phase

FIG. 5 is a flow diagram of an exemplary design phase. The exemplary design phase begins with defining processes to deliver outcomes (block 502). As explained below, the results of the activity performed at block 202 include a membership/outcome matrix, and a process/activity catalogue.

The outcomes that are relevant in the activity at block 502 are the outcomes required by the community charter (which is created in the definition phase, described above). The activity that takes place at block 502 is directed toward transforming the desired outcomes into practical things that the community membership can do in relation to the use of knowledge. The base assumption for this activity is that everything people do in an organization is part of some process. It may be a simple process with one activity, or a complex process with multiple activities and sub-activities; it may be very well-defined (or well-definable), or it may be impossible to define precisely because of its inherent flexibility. Nevertheless, it is possible to view everything people in an organization do as being part of a process.

There are at least four classes of process that are preferably considered:

Current business processes where improved management of knowledge, possibly combined with adjustments to the process itself, will contribute to the achievement of one or more outcomes New business processes that exploit knowledge in a way that contributes to the achievement of one or more outcomes Standard community processes that exploit/manage knowledge in a way that contributes to the achievement of one or more outcomes New community processes that exploit/manage knowledge in a way that contributes to the achievement of one or more outcomes The business processes (first two bullet points above) are typically addressed at block 502; the community processes are typically addressed at block 514.

The inputs to block 502 include:

The list of outcomes as derived during the definition phase

The list of sub-parts or segments of the community membership ("constituencies")

The outputs from this activity include:

The process/activity catalogue which is used by the develop knowledge maps activity (block 504, discussed below)

The membership/outcomes matrix. Any unrepresented outcomes in this matrix indicate work to be covered in the specify community processes activity Creating a Membership/Outcomes Matrix A membership/outcomes matrix is created by first creating a matrix template, and then populating the matrix with process names. In order to create the template, a table is created with member "constituencies" (i.e., the people who participate in the community) and community outcomes written along the sides of the table. The table thus shows the particular outcome for each constituency that is achieved by performing the specified process. After such a table is created, the table is populated with process names. It may be helpful to consider both existing business processes, as well as new business processes.

The following is an exemplary table for a membership/outcomes matrix:

TABLE 1

Membership/Outcomes Matrix

|  | Constituency-1 | Consistuency-2 | Consistuency-3 |
|---|---|---|---|
| Outcome-1 | | | |
| Current Processes | | | |
| New Processes | | | |
| Outcome-2 | Process-1 | | Process-1 |
| Current Processes | Knowledge Item-1 | | Knowledge Item-2 |
| | Knowledge Item-2 | | |
| New Processes | | | |
| Outcome-3 | Process-1 | | Process-3 |

TABLE 1-continued

Membership/Outcomes Matrix

| | Constituency-1 | Constituency-2 | Consistuency-3 |
|---|---|---|---|
| Current Processes | Knowledge Item-3 | | |
| New Processes | | | |
| Outcome-4 | | | |
| Current Processes | | | |
| New Processes | Process-4 | | Process-4 |

Creating a Process/Activity Catalogue

A process/activity catalogue records the decomposition of the processes into their activities. It also normalizes the list of processes since a process could appear more than once within the constituencies/outcomes matrix.

The process/activity catalogue is created as follows. First, the unique process that appears within the membership/outcomes matrix (plus any knowledge items listed in that matrix) are identified. Next, each process is decomposed into its constituent activities. Then, the person (in terms of his/her business role) who performs each process is identified. Next, each activity is described. The following is an example of a table that represents a process/activity catalogue:

TABLE 2

Process/Activity Catalogue

| PROCESSES | | Activities | | |
|---|---|---|---|---|
| Process-X | Activity Name | Activity-X1 | Activity-X2 | Activity-X3 |
| Knowledge Item-1 | Performed by | Role-1 | Role-1 | Role-2 |
| Knowledge Item-2 | Description | Description | Description | Description |
| ... | | | | |
| Process-Y (New) | Activity Name | Activity-Y1 | | |
| | Performed by | Role-1 | | |
| | Description | Description | | |
| Process-Z | Activity Name | Activity-Z1 | Activity-Z2 | |
| Knowledge Item-2 | Performed by | Role-3 | Role-2 | |
| Knowledge Item-3 | Description | Description | Description | |
| ... | | | | |

Thus, in essence, the result (or "output") of block 502 includes a membership/outcomes matrix, and a process/activity catalogue, as described above.

Returning to FIG. 5, the next activities performed in the design phase are the development of knowledge maps (block 504) and the specification of metrics and measurements (block 510), which may take place concurrently. These activities are described below.

Block 504: Development of Knowledge Maps

A knowledge map, as used herein, is an association of knowledge assets with business processes/activities. It is used as a design tool. More specifically, a knowledge map associates those processes and activities—performed by members of the community—that contribute to the required outcomes of the community, with the knowledge items (tacit and explicit) required to perform, and generated by, these processes and activities.

The inputs to the activity at block 504 are the processes and activities listed in the process/activity catalogue, described above. The outputs from the activity at block 504 are a knowledge map and a "preliminary knowledge catalogue."

Creating a Knowledge Map

A knowledge map is a means of gathering together information associated with relevant business processes/activities performed by community members. A variety of means can be used to gather the information required for this task, and it may be convenient to combine the information gathering for this task with that for the activity at block 502 (discussed above). The relevant information can be gathered from pre-existing process maps, workshops, one-on-one interviews with individual (potential) community members, surveys, etc.

The following is an exemplary template for a knowledge map:

TABLE 3

Knowledge Map

| PROCESSES | | Activities | | |
|---|---|---|---|---|
| Process-X | Activity Name | Activity-X1 | Activity-X2 | Activity-X3 |
| | Performed by | Role-1 | Role-1 | Role-2 |
| | Description | — | — | — |
| | Knowledge Used | | | |
| | Knowledge Generated | | | |
| | Approaches to Process Improvement | | | |
| Process-Y (New) | Activity Name | Activity-Y1 | Activity-Y2 | Activity-Y3 |
| | Performed by | Role-1 | Role-1 | Role-2 |
| | Description | — | — | — |
| | Knowledge Used | | | |
| | Knowledge Generated | | | |
| | Approaches to Process Improvement | | | |

In creating the knowledge map, the following attributes are recorded for each activity:

The knowledge items used from that activity
  During the development of the membership/outcomes matrix, some knowledge items may have been identified along with the processes that populated that matrix. Identification of the knowledge items should be completed in the knowledge map, and these knowledge items should be allocated them to the appropriate activity within the process.

What knowledge items are generated for that activity
  In the context of explicit knowledge, "generated" means creating some artifact, and in the context of tacit knowledge, "generated" means "learned".

How is learning about improvements to the process/activity undertaken ?
  This information provides the basis for assessing the process-related learning capability and requirements for codifying tacit knowledge. It may be convenient to capture this information at this point in the process (e.g., if community members are being interviewed at this time).

Additionally, knowledge transfer opportunities may be recorded at this time (i.e., the opportunities to transfer knowledge to activities, processes, or communities other than those with which the knowledge is currently associated).

Creating a Preliminary Knowledge Catalogue

The previously-described activities in the process of enabling knowledge communities have focused primarily on identifying knowledge items without regard to the form of the knowledge. Creation of a preliminary knowledge catalogue focuses on identifying the artifacts for the explicit knowledge and the people/roles that possess the tacit knowledge.

The process of creating a preliminary knowledge catalogue preferably begins with preparing a knowledge template. The knowledge template preferably shows, for each knowledge item, one or more of the following items of information:

A textual description of the knowledge

Whether the knowledge is tacit or explicit

The knowledge item's availability

The quality of the knowledge item

The current source of the knowledge item

The desired source of the knowledge item

The following is a description of each of the foregoing items:

Textual description: The description here is preferably sufficient to: (a) differentiate between different knowledge items and highlight those that are, in essence, the same; (b) assess the degree to which the knowledge is actually available; and (c) assess the quality of the knowledge.

Whether the knowledge is tacit or explicit: Tacit and explicit knowledge should be differentiated as follows: "Explicit" knowledge is structured or unstructured information that exists in a form that can be subjected to content management processes. For example, email messages are not normally explicit since they are not normally given meta-tags, expiration dates and explicitly managed for public use by a content manager. "Tacit" knowledge, on the other hand, is knowledge in people's heads, together with recorded knowledge/information that is not subject to content management processes. The source of a knowledge item may determine whether or not it is tacit or explicit. For example, "Insurance Industry Knowledge" may be recorded in various reports, and so be explicit in that form; but in certain cases it may be needed in tacit form—in someone's head—such as during a client presentation.

Availability: An assessment of the degree to which the knowledge item is available when and where it is required. For explicit knowledge, "0% available" may mean that no artifact exists, or if it does, it is not available at the time and place it is required. "Less than 100% available" would mean that not all the knowledge required is available. For tacit knowledge, "0% available" may mean no-one possessing that knowledge is available at the right time and place, or that no-one at all possess that knowledge. "Less than 100% available" may mean that not enough people of a given role possess the knowledge, or that they possess only partial knowledge.

Quality: An assessment of the quality of the knowledge referred to by the knowledge item. It should measure the extent to which the knowledge can be relied upon for its stated use. For example, a knowledge item that is 100% available may have very suspect quality (perhaps because the source cannot be trusted). Conversely, an item that is only 45% available may have a quality rating of 100%. ("We are confident of what we know, but we need to know more.")

The current source of the item: For tacit knowledge, the source should be expressed as a business role or a specific person/people.

The desired source of the knowledge (if different from the current source): For knowledge that already exists, a different entry here is a statement that an alternative source is more desirable. For knowledge that does not exist, this is a statement of the most appropriate source.

The following table shows an exemplary knowledge catalogue:

TABLE 4

Knowledge Catalogue

| | Description | Tacit or Explicit | Availability (Desired Src) | Quality (Desired Src) | Current Source | Desired Source |
|---|---|---|---|---|---|---|
| Knowledge Item-1 | — | T | 25% | 75% | Role-1 | Role-2 |
| Knowledge Item-2 | — | E | 0% | N/A | Role-1 | Artifact-1 |
| Knowledge Item-3 | — | E | 100% | 60% | Artifact-2 | Artifact-3 |
| Knowledge Item-4 | (Same as Item-3) | T | 20% | 100% | Artifact-4 | Role-3 |

The following example shows what can be inferred from the exemplary knowledge catalogue shown in Table 4, including the transformation between knowledge sources based on "current" and "desired" knowledge sources:

| | |
|---|---|
| Tacit –> Tacit | (Knowledge Item-1) |
| Tacit –> Explicit | (Knowledge Item-2) |
| Explicit –> Explicit | (Knowledge Item-3) |
| Explicit –> Tacit | (Knowledge Item-4) |

Knowledge Item-1: People in Role-2 require urgent additional training in this topic. Perhaps those in Role-1 can provide the training.

Knowledge Item-2: People in Role-1 again are key. Currently their knowledge is being used directly, but it needs to be captured and made explicit in Artifact-1.

Knowledge Item-3: The quality of the knowledge needs to be improved. Perhaps the artifact being used is not sufficiently trustworthy. A new artifact is required.

Knowledge Item-4: This has been found to be essentially the same knowledge as Item-3. The knowledge map would show that knowledge being used in at least two distinct activities. In one case it is sufficient to use Artifact-3, in another that knowledge needs to be in the heads of people having role Role-3. This demonstrates the need for people in Role-3 to be trained in the knowledge contained in Artifact-3—which itself is derived from Artifact-4.

Returning to FIG. 4, once knowledge maps have been created, management for explicit and tacit knowledge may be specified (blocks 506 and 508). As noted above, explicit knowledge includes information that exists in a form that can be subjected to content management processes—e.g., information written on paper, stored in on a computer, etc., whereas tacit knowledge is known to people but is not expressed in any form that can be managed by paper or electronic content management techniques. Thus, the process of managing these two types of knowledge is different. Explicit knowledge may be managed, for example, by storing it in a database, creating a table (electronically or on paper), creating an index, etc. Tacit knowledge is managed, in essence, by facilitating the sharing of such knowledge with members of the knowledge community—e.g., by regular oral debriefings, story telling, virtual brown-bag lunches, etc.

An activity that may occur in parallel with blocks 504-508 is the specification of metrics and measurements (block 510). In essence, the measurement and metrics are used to quantify outcomes produced by managed knowledge. This activity is described below.

Block 510: Specification of Metrics and Measurement

Measurement and metrics address the issue that the outcomes and advantages of a knowledge community should, preferably, be visible. Given that forming and sustaining a knowledge community requires an investment in time and resources, as well as some modification of the behavior of the community members, visible and measurable results support the continued existence of the community and the continued behavior that results in effective knowledge management.

Preferably, a knowledge management system provides at least some of the following functions:

Identifying the specific performance increments that are expected;

Directing a community's activities to achieve these performance increments;

Monitoring progress towards expected performance "targets" over time;

Adjusting community activity to keep progress on track.

Without such a system in place, a community will have no basis for reviewing the results of its activities. It would be unlikely to be able to claim that it has achieved, or is achieving, its outcomes—which will leave the community vulnerable to other business pressures for resources.

So, some purposes of measuring community performance are to provide:

A process to manage the achievement of community outcomes;

Evidence to encourage continued community formation and deployment;

Input to the identification and counteraction of barriers and learning from success.

Each community is a unique organization that defines its own outcomes to reflect its unique context. As a result, there are no intrinsic performance measures that apply to all communities. In addition, any single "outcome" can materialize in different ways. An outcome is a fact about the future state for the community, perhaps a capability that will enable the community or its members to perform better than present. Outcomes are monitored via the specific, measurable benefits that are enabled by the achievement of the outcome.

The following example illustrates the difference between outcomes and benefits. Assume for a moment that a community has as one of its outcomes "greater efficiency" in the work that its members perform. "Efficiency" itself may be regarded as intangible and is unlikely to be reported. Defined for business as the ratio between input and output resources of an activity, it is an indicator or quotient for "performance" and does not translate directly into an economic or other benefit. However, it enables a range of effects.

The benefits to be derived depend on how members/their management (or the community) exploit the efficiency increment, for example:

Better customer service (or other critical business quality/customer value) due to re-deployment of resources from roles in one (say "back office") activity to roles in another, more critical (say "front office") activity;

Better customer service (or other critical business quality/customer value) due to new emphasis on a quality impacted by the activity—more time/resource now being available without incurring additional cost;

Cost saving in the payroll budget due to re-grading of the activity—the activity can be performed with less experienced, skilled or costly personnel;

New services/new lines of revenue due to re-deployment of the more experienced, skilled or costly resources saved in the previous example to new roles for which their experience/skill is at a premium;

Cost saving in the payroll budget due to reduction in headcount.

Each of the above benefits suggests the different type of performance metric (quality/customer value metric, activity cost, role/skill spec., training cost, revenue, payroll, etc.).

At the root of performance management for knowledge management communities is the translation of community outcomes to observable benefits. In general, outcomes have one or more benefits associated therewith. An outcome may, optionally, be viewed as being broken down into sub-outcomes. In general, outcomes may, optionally, be broken down into sub-outcomes.

Preferably, a community's measurement and metrics system should be:

Practical and cost effective (the cost of measurement should be less than the value of the benefit being measured);

Inclusive of positive and negative effects (it is useful to learn from the good and the bad experiences of introducing KM);

Qualitative and quantitative (if quantitative metrics cannot be identified or devised, qualitative metrics and/or indicators are to be used);

Representative of all relevant, significant viewpoints (all key stakeholder groups should be taken into account in assessing the impact of knowledge management);

Acceptable to those doing performance measurement (those spending time and effort to measure community performance should be content to do so);

Aligned to the outcomes of the community;

Traceable to knowledge management activities.

The following is a set of tasks that are performed in the process of creating measurements and metrics:

Task 1—Identify Benefits

In this task, each community outcome appearing in the vision section of the community charter is translated into one or more benefits. The task should be conducted via "brainstorming" without much effort placed in evaluation at this stage. It is more important to identify stakeholders and relevant value systems that metrics/indicators during this task.

The following steps are involved:

1. Create a list of the outcomes, as identified in the definition phase;
2. Identify the stakeholders that will benefit from each outcome;
3. Identify the value system(s) (customer relations, economy, product/service innovation, employee satisfaction, product/service quality/effectiveness, etc., as befits the significance of the outcomes to the stakeholders) in which the benefit will impact each identified stakeholder;
4. Describe each impact on each stakeholder in terms of a relevant value system.
5. Complete a draft Benefits Register, recording, for example:
   Serial number (#) for each benefit
   Description of the benefit
   Stakeholder impacted by the benefit—the "beneficiary"
   Identification of the relevant value system
   Whether an objective or subjective metric is likely (fact- or opinion-based)
   Potential metric/indicator, if obvious, or if unsolicited opinions are expressed
   Degree of impact (large-scale/enterprise-wide through small-scale/local)
   Most likely location (business grouping) where monitoring will be feasible.

Typically, a large number of benefits will be identified using this approach.

Task 2—Prioritise Benefits

Prioritization is performed on the information recorded in the previous task. Prioritization is generally based on choice of stakeholder, degree of impact and monitoring location.

If the draft benefits register has been built using a software tool such as Microsoft® Excel®, it will be possible to sort line items or rows into ascending/descending tabulations based on selected data fields (criteria).

Benefits that should be monitored are deemed to be "priority" benefits, as opposed to "non-priority" benefits for which no further action is necessary (except as detailed below). Priority benefits are taken through to Task 3.

A determination should be made as to whether any of the registered benefits are to be discarded after prioritization as being "non-priority". They should be retained in the benefits register where they can be brought into use later if any of the "priority" benefits turn out to be too difficult/unsuitable to measure. They can also add value to other communities in their performance of Task 1.

Task 3—Agree Metrics and Indicators

In Task 3, at least one metric or indicator is defined for each benefit. A metric is a means for direct measurement of the performance variable deemed to be beneficial. Commonly, metrics are applied to tangible benefits. An indicator is an indirect means for measuring a benefit. Indicators are used where direct measurement is not possible but the benefit can be detected in relative or subjective terms. Indicators tend to be applied to intangible benefits.

The task is not to be limited by metrics/indicators currently available in the community's business environment. If necessary, new metrics/indicators can be devised and developed during the Development Phase of the community set-up process.

Task 4—Develop Performance Management Plan

The performance management plan is the specification of how a community's performance will be monitored and reported. The plan is based on the outputs of the preceding tasks, and describes the benefits monitoring tasks to be conducted by specific individuals in accordance with a planned scheduled.

Having defined its community outcomes, the community commits to monitor its achievement of those outcomes via its Performance Management Plan. Actual monitoring takes place during the later phases of the community lifecycle:

Baselining current performance is done during the development phase;
Monitoring changes in performance is done during the operational phases.

TABLE 5

Summary of Tasks for specifying metrics and measurement

| # | Task | Input | Output |
| --- | --- | --- | --- |
| 1. Identify Benefits | Translate each community outcome into one or more benefits and identify relevant metrics and/or indicators. | Community Charter, in particular Community Outcomes | Benefits Register |
| 2. Prioritize benefits | Differentiate benefits worth tracking from those with less significance/not worth tracking. | Benefits Register | Prioritised/filtered Benefits Register |
| 3. Agree on measures and indicators | Identify relevant performance metrics and indicators for each prioritised benefit, and estimate approximate value of benefits. | Prioritised/filtered Benefits Register | Prioritised list of benefits with agreed indicators and measures |
| 4. Create performance management plan | Define who will capture which metrics/indicators, how and when, and how/when performance reporting will be conducted. | Prioritised list of benefits with indicators and measures | Performance Management Plan |

It may be useful to create a benefits register that provides an inventory of benefits expected from the formation and operation of a knowledge community. An MS Access database, MS Excel spreadsheet or MS Word table can be used to create and maintain the register.

It may further be useful to create a performance management plan, which identifies which benefits are of current interest, the measures or indicators that are to be used to capture performance data, measurement techniques, responsibility for performance and the time frame for when measurements will be taken.

Additionally, a community performance report may be created to describe the progress of a community towards the achievement of the expected outcomes defined in the community's charter. The report can be produced quarterly from community deployment onwards.

In a preferred embodiment, the community performance report does the following:
Describes the status of the benefits being monitored;
Describes the results of measurements/indications;
Illustrates trends in progress towards expected outcomes;
Provides comments on the results;
Recommends appropriate actions to steer community activity more successfully towards achievement of outcomes for this community, and for other communities if appropriate.

Returning to FIG. 4, knowledge management is specified (blocks 506 and 508), and after the specification of metrics and measurements (block 510), various other activities take place. Among these activities are the specification of community processes (block 514), the specification of community organization (block 516), the specification of community behaviors (block 518), and the specification of technology requirements (block 520). The activities at blocks 514-520 may occur in parallel.

As further shown in FIG. 4, other activities that take place are the capturing of business change requirements (block 522), the specification of any technology solution that may be used (block 524) (e.g., designing a "web-page"-like portal to facilitate access to the knowledge), and consolidation of the community design (block 526).

Following the consolidation of the community design (block 526), the design process proceeds to the activity of gaining acceptance of the community design (block 528). From that point, the flow of activity proceeds to designing a community launch event (block 530), developing a community action plan (block 532), and gaining acceptance of the community action plan (block 534).

Following the design phase, activity proceeds to the development, deployment, and operations phases (blocks 208-212), as described in FIG. 2.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A computer-implemented method for creating a matrix for sharing knowledge within at least one community, said matrix comprising at least one of a plurality of processes performed by an entity correlated with a desired outcome produced by the process, the method comprising:
   identifying a plurality of entities, wherein each entity executes at least one of the plurality of processes;
   identifying a plurality of outcomes, wherein each of the plurality of processes produces at least one of said outcomes;
   creating and storing a matrix that correlates said plurality of outcomes with said plurality of entities, wherein each pair of said outcomes and said entities is represented by a point on said matrix; and
   for a first of said plurality of processes which is performed by a first of said entities and which produces a first of said outcomes, indicating said first of said plurality of processes at a first point on said matrix which corresponds to a pair of said first entity and said first outcome, wherein said matrix is shared within at least one community.

2. The computer-implemented method of claim 1, wherein said first outcome produces a benefit to at least one of said entities.

3. The computer-implemented method of claim 2, further comprising:
   defining a metric which quantifies a benefit of said first outcome.

4. The computer-implemented method of claim 1, further comprising:
   including, at said first point, a desired process which produces a second one of said outcomes, said desired process not being included among the plurality of processes.

5. The computer-implemented method of claim 1, wherein said entity is a person.

6. A computer-implemented method for creating a knowledge map for sharing within at least one community, said knowledge map including a mapping of at least one process that an entity performs with a desired outcome and items of knowledge used for and items of knowledge generated as a result of performing the at least one process, the method comprising:
   identifying a plurality of processes including a first process;
   identifying a plurality of entities including a first entity, wherein each of said plurality of entities performs at least one of said processes, and wherein said first entity performs said first process;
   identifying a first item of knowledge used by said first entity in the execution of said first process;
   identifying a second item of knowledge generated by said first entity as a result of said first entity's executing said first process;
   creating and storing a knowledge map having a first dimension and a second dimension, wherein said first dimension has first attributes corresponding to said plurality of entities, wherein said second dimension has second attributes corresponding to said plurality of processes, and wherein a point on said knowledge map is uniquely identifiably by a pair comprising one of said first attributes and one of said second attributes; and
   including said first and second items of knowledge in said knowledge map at a first point identified by a pair comprising a first attribute corresponding to said first entity and a second attribute corresponding to said first process,
   wherein the knowledge map is shared within at least one community.

7. The computer-implemented method of claim 6, further comprising:
   including, at said first point, information indicative of an opportunity to transfer said first knowledge or said second knowledge.

8. The computer-implemented method of claim 6, further comprising:
   including, at said first point, information indicative of an approach to improving said first process.

9. The computer-implemented method of claim 6, further comprising:
   including, at said first point, information indicative of whether said first item of knowledge is tacit or explicit.

10. The computer-implemented method of claim 6, further comprising:
    including, at said first point, information indicative of an opportunity to transfer said first item of knowledge to a second of said plurality of processes different from said first process.

* * * * *